UNITED STATES PATENT OFFICE.

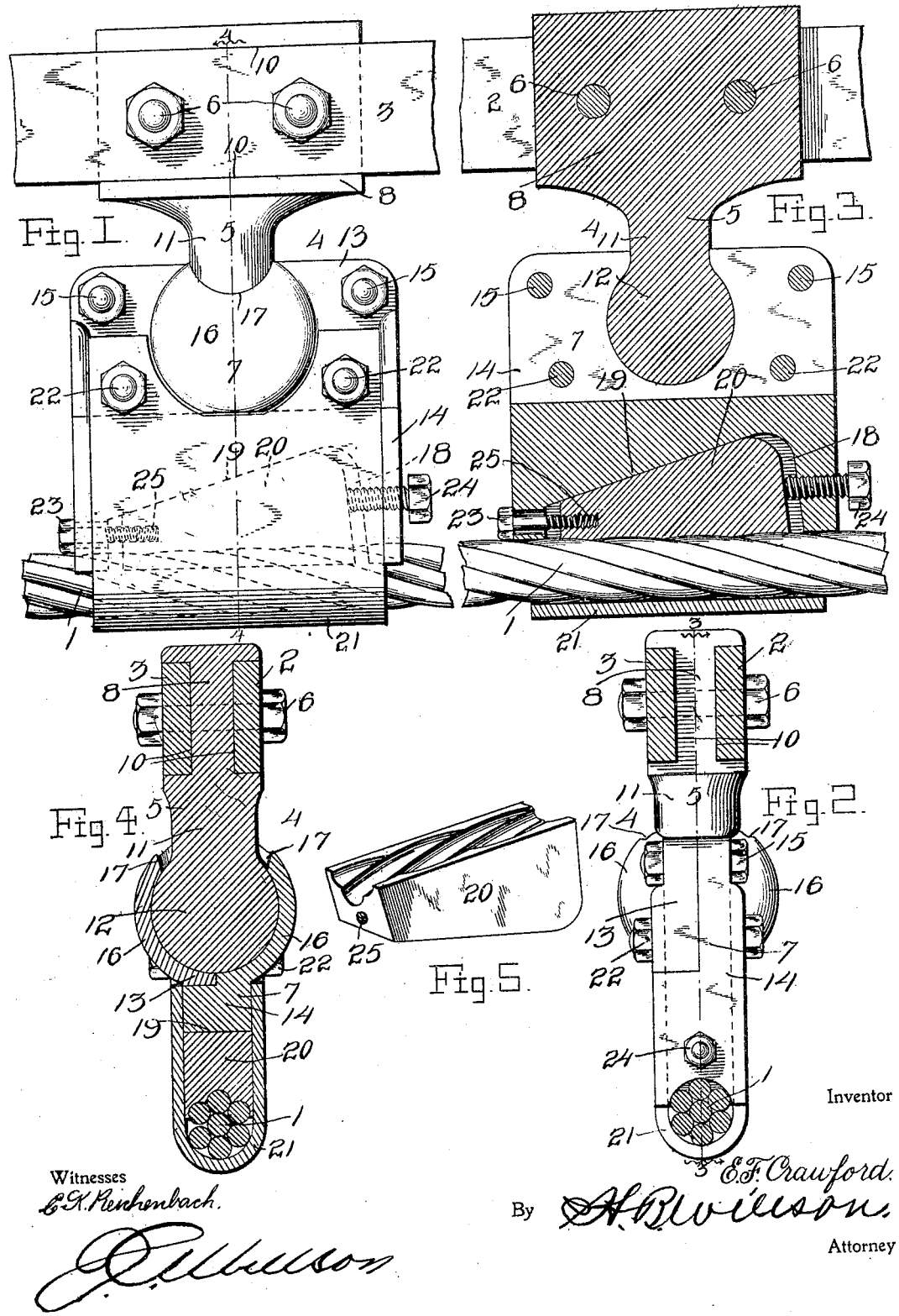

ENON FERNANDO CRAWFORD, OF NELSON, CANADA.

CLIP FOR TRACTION-ROPES OF AERIAL TRAMWAYS.

No. 797,943.           Specification of Letters Patent.           Patented Aug. 22, 1905.

Application filed March 11, 1904. Serial No. 197,729.

*To all whom it may concern:*

Be it known that I, ENON FERNANDO CRAWFORD, a subject of the King of Great Britain, residing at Nelson, in the Province of British Columbia and Dominion of Canada, have invented certain new and useful Improvements in Clips for Traction-Ropes of Aerial Tramways; and I do declare the following to be a full, clear, and exact description of the invention, such as will enable others skilled in the art to which it appertains to make and use the same.

This invention relates to improvements in aerial-tramway traction-rope clips of that class designed for attaching a bucket or the like to a running rope or cable, so as to permit the bucket and cable to have movement independent of each other.

One of the objects of my invention is to provide a clip of this character which may be securely fastened to a running rope or cable at one end and to the pendant of a bucket or other container at its other end and which has intermediate its ends a ball-and-socket joint whereby a revolving and a vertical swinging movement is obtained.

Another object of my invention is to provide a simple, compact, durable, and comparatively inexpensive clip of this character which may be quickly and easily attached to and detached from the traction rope or cable and which will afford a large wearing-surface on the rope or cable at the point that is subjected to the greatest amount of wear.

With these and other objects in view the invention consists of certain novel features of construction, combination, and arrangement of parts, as will be more fully described, and particularly pointed out in the appended claims.

In the accompanying drawings, Figure 1 is a top plan view of my improved clip for aerial-tramway traction ropes or cables. Fig. 2 is an end elevation of the same. Fig. 3 is a horizontal sectional view taken on the line 3 3 of Fig. 2. Fig. 4 is a vertical sectional view taken on the line 4 4 of Fig. 1. Fig. 5 is a perspective view of the wedge of the clip.

Referring to the drawings by numeral, 1 denotes a traction rope or cable, 2 and 3 denote the draw-bar and brace, respectively, of the pendant or hanger of a bucket or container of a similar character, and 4 denotes my improved clip. The latter comprises a ball member 5, which is rigidly secured to said bar 2 and brace 3 by bolts 6, and a socket member 7, rigidly secured to said rope or cable 1.

The ball member 5 may be cast or drop-forged, as desired, and comprises a rectangular body portion 8, formed on its top and bottom faces with longitudinal grooves or channels 10, in which said bar 2 and brace 3 are seated, so as to reduce the strain upon the bolts 6, which pass through alining apertures formed in said bar 2, body portion 8, and brace 3, as shown. On one side of said body portion 8 is formed a neck 11, having upon its outer end a ball or sphere 12, which is adapted to be engaged by the socket member 7 to provide a ball-and-socket joint or connection between the two members.

The socket member 7 comprises two half sections or members 13 and 14, preferably in the form of castings, secured together by bolts 15 and each having a semispherical depression 16, which, in conjunction with the similar depression on the other member, forms a spherical socket to receive the said ball 12. Said depressions 16 are provided at their upper ends with cut-away portions 17, which form an elongated circular opening or slot through which the neck 11 projects and in which it is permitted to have a free rotary as well as a vertical swinging movement. The casting or member 14, which is of greater width than the member 13, is formed on one side with an opening or recess 18, having an inclined or angularly-disposed inner wall 19, and in said recess 18 is adjustably mounted a wedge 20, between which and a U-shaped plate 21 is clamped the rope or cable 1. The said U-shaped plate 21, which is preferably of steel, entirely incloses the said wedge and a portion of the cable and extends over upon the tops and bottoms of the members 13 and 14, to which it is secured by bolts 22, and said bolts passing through both of said members coact with the bolts 15 in holding them together. The said wedge 20 has the lay of the rope or cable 1 formed in one of its sides, while its opposite side engages the inclined wall 19 of the said recess 18. The wedge is adjusted longitudinally in said recess 18 by set-screws 23 and 24, disposed at each end of said casting or member 14. The screw 23 extends through a slot formed in one end of said member 14 and has its inner end screwed into a screw-threaded opening 25, formed in the small end of the wedge, so that when said screw is turned in one direction it will draw the wedge longitudinally in the recess and force the cable against the U-shaped plate, thus securely gripping the cable. The screw 24 projects through a screw-threaded opening in the opposite end of the member 14 and has its inner end bearing upon the large end of the wedge to hold it securely in position.

The clip is particularly designed to be disposed when in use in a horizontal position, as shown and described, the bucket to the pendant of which the clip is attached being supported by a carriage mounted upon a track and being drawn forwardly or rearwardly by the running or traction rope or cable.

It will be seen that my improved clip provides a simple, strong, and durable connection between the bucket and the rope or cable which may be quickly and easily applied, removed, or adjusted and which will permit the rope and bucket to have a free movement independent of each other.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A clip of the character described comprising two members having a ball-and-socket joint or connection, means for securing one of said members to a bucket or the like, a U-shaped plate upon the other of said members adapted to surround a traction rope or cable, and a wedge interposed between the latter-mentioned member and said rope or cable to hold the latter in engagement with said plate, substantially as described.

2. A clip of the character described comprising two members having a ball-and-socket joint or connection, means for securing one of said members to a bucket or the like, the other of said members being formed with a recess, a wedge in said recess, a U-shaped plate attached to the latter-mentioned member and adapted to hold a traction rope or cable in engagement with said wedge, and a set-screw for adjusting said wedge, substantially as described.

3. A clip of the character described, comprising two members having a ball-and-socket joint or connection, means for securing one of said members to a bucket or the like, the other of said members being formed with a recess, and a slot or opening at one end of said recess, a wedge in said recess having a screw-threaded opening in its small end, a screw projecting through said slot or opening in said member and engaged with said screw-threaded opening in said wedge, and a U-shaped plate attached to the latter-mentioned member and adapted to surround a traction rope or cable, substantially as described.

4. A clip of the character described, comprising two members having a ball-and-socket joint or connection, means for securing one of said members to a bucket or the like, the other of said members being formed with a recess, and a slot or opening at one end of said recess, a wedge in said recess having a screw-threaded opening in its small end, a screw projecting through said slot or opening in said member and engaged with said screw-threaded opening in said wedge, a U-shaped plate attached to the latter-mentioned member and adapted to engage a traction rope or cable, and a set-screw at the opposite end of said recess adapted to bear upon the large end of the wedge to hold the same in an adjusted position, substantially as described.

5. A clip of the character described, comprising a ball member adapted to be attached to a bucket or the like and a socket member comprising two attached half sections or members, one of said half sections or members being formed with a recess, an adjustably-mounted wedge in said recess, and a U-shaped plate attached to said half sections or members and adapted to engage a traction rope or cable, substantially as described.

In testimony whereof I have hereunto set my hand in presence of two subscribing witnesses.

ENON FERNANDO CRAWFORD.

Witnesses:
E. A. CREASE,
HARRY KIRK.